United States Patent [19]
Nakamura et al.

[11] Patent Number: 5,490,017
[45] Date of Patent: Feb. 6, 1996

[54] SIGNAL REPRODUCING APPARATUS

[75] Inventors: Akihiko Nakamura, Osaka; Yoshio Sakakibara, Neyagawa; Makoto Gotou, Nishinomiya; Haruo Isaka, Yawata; Kazuhiko Kobayashi, Moriguchi, all of Japan

[73] Assignee: Matsushita Electric Industrial Co., Ltd., Osaka, Japan

[21] Appl. No.: 112,657

[22] Filed: Aug. 27, 1993

[30] Foreign Application Priority Data

Sep. 11, 1992 [JP] Japan ................................... 4-243048
Jan. 6, 1993 [JP] Japan ................................... 5-000511

[51] Int. Cl.$^6$ .................................................. G11B 15/48
[52] U.S. Cl. ...................... 360/10.2; 360/10.3; 360/77.14
[58] Field of Search .................. 360/77.14, 10.2, 360/10.3, 27, 36.1, 77.13; 358/323, 337, 338

[56] References Cited

U.S. PATENT DOCUMENTS 4,841,380  6/1989  Kozuki et al. .......................... 360/10.2
4,882,634 11/1989  Satoh .................................... 360/10.2
4,910,613  3/1990  Mabuchi et al. ................... 360/10.2 X

FOREIGN PATENT DOCUMENTS 59-201260 11/1984 Japan.
1-319157 12/1989 Japan.

Primary Examiner—Aristotelis Psitos
Assistant Examiner—James L. Habermehl
Attorney, Agent, or Firm—Wenderoth, Lind & Ponack

[57] ABSTRACT

A signal reproducing apparatus, which reproduces data from a tape in which data and a pilot signal for tracking have been recorded In oblique tracks, includes a tape driver for running the tape in the longitudinal direction, a rotary head for rotating and scanning the tape to produce reproduction signals, a reference generator for generating a reference signal which Is the rotation standard of the rotary head, a tracking error detector for producing a tracking error signal from the pilot signal contained in the reproduction signals, and a timing controller for controlling the start timing of tape running of the tape driver with respect to the reference signal, on the basis of the tracking error signal and reference signal in the stopped state of tape running.

14 Claims, 13 Drawing Sheets

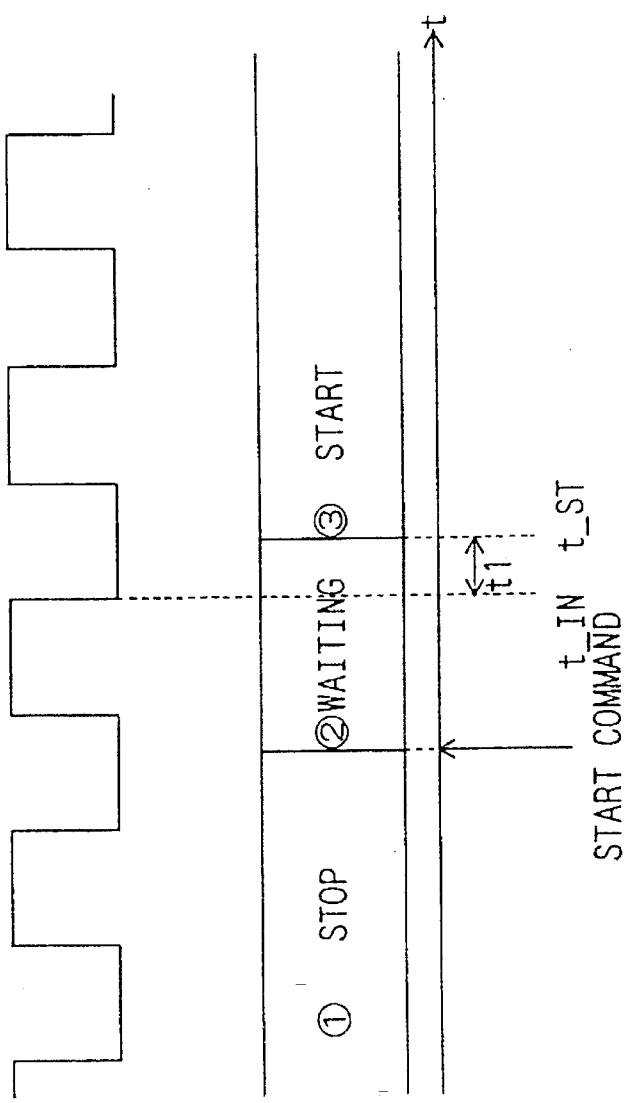

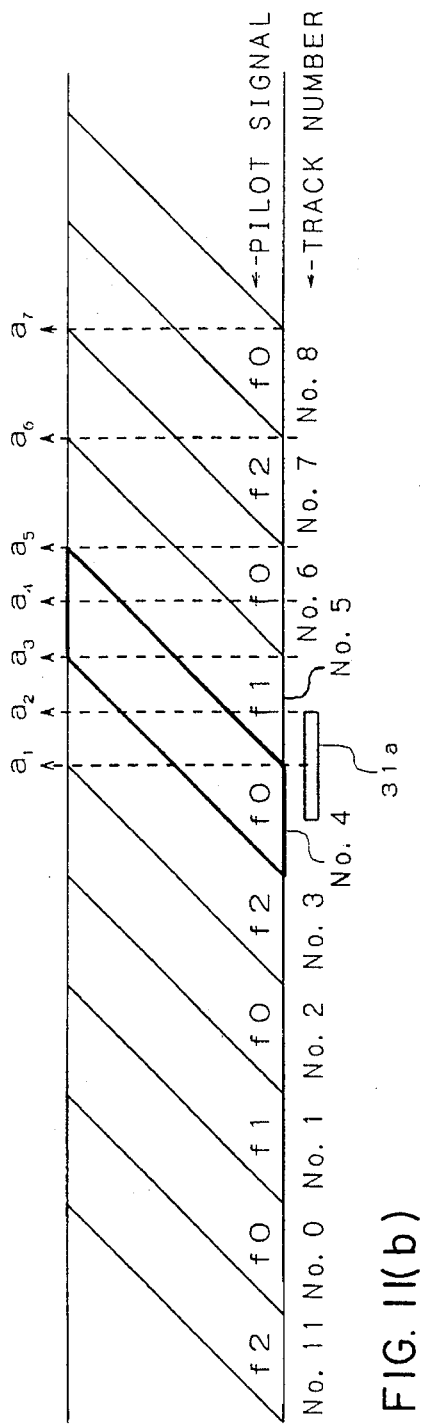
FIG. II(a)
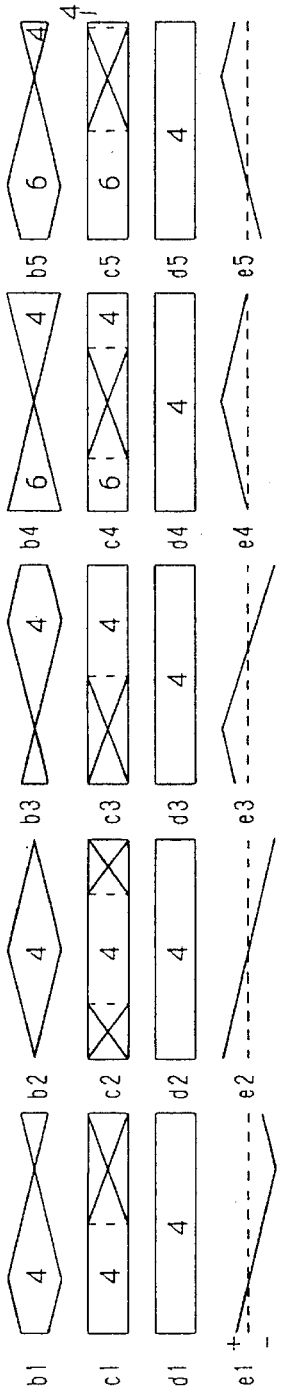
FIG. II(b)
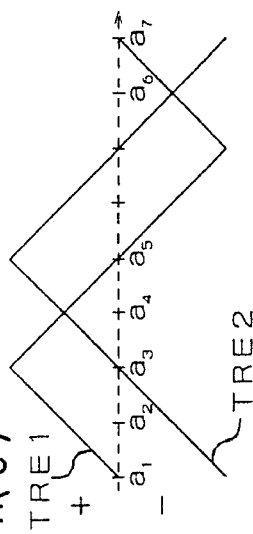
FIG. II(c)

FIG. 12(a)
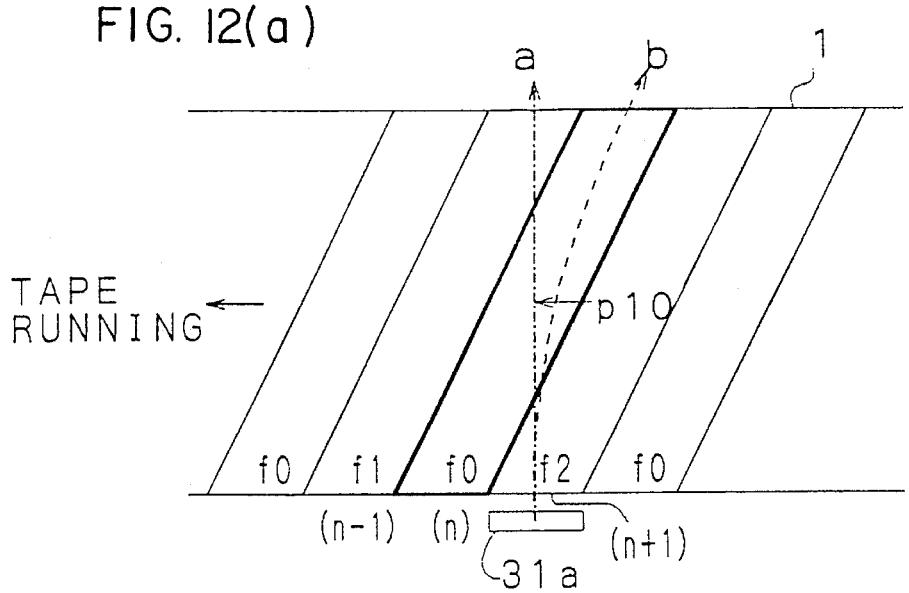
FIG. 12(b)
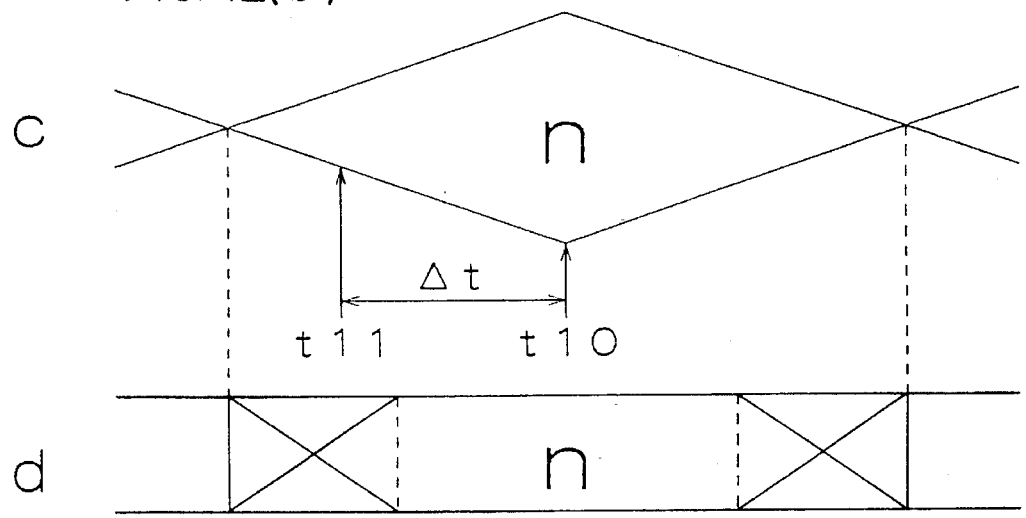
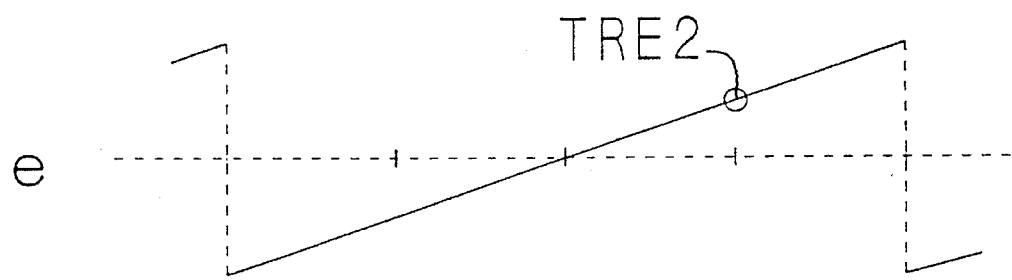

FIG. 13(a)
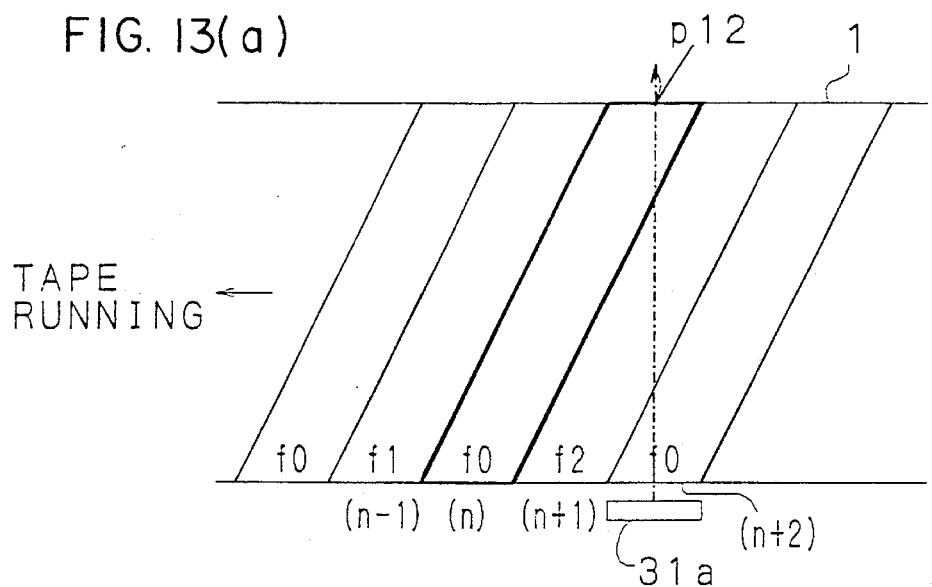
FIG. 13(b)
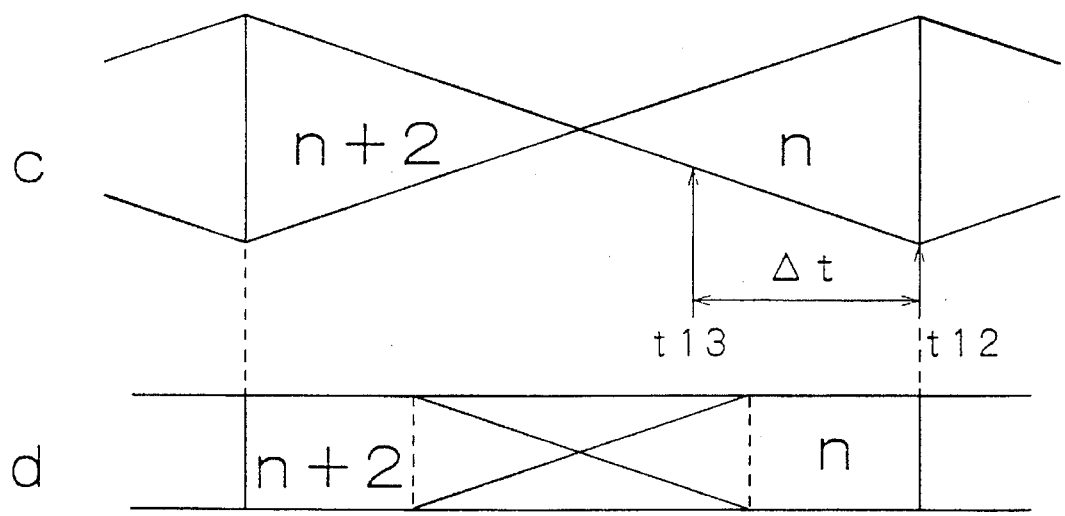
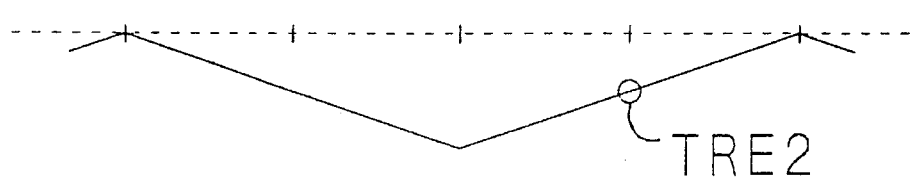

SIGNAL REPRODUCING APPARATUS

BACKGROUND OF THE INVENTION

1. Field of the Invention

The present invention relates to a signal reproducing apparatus for reproducing information signals recorded in oblique tracks on a magnetic tape by means of a magnetic head.

2. Description of the Prior Art

In a signal reproducing apparatus for reproducing information signals recorded as oblique tracks on a tape, the tape is normally helically scanned by a rotary head. Also, the signals recorded on a tape are divided in each track for convenience during reproduction.

Tracking control of the rotary head and the oblique tracks on the tape was hitherto effected by reproducing the control signal recorded by a fixed magnetic head at one side in the widthwise direction of the tape by the same fixed head, and adjusting the reproduced control signal and the rotation phase of the rotary head in a specific phase relation. This method is employed, for example, in the videotape recorder (VTR) of the VHS format.

In this method, however, a fixed magnetic head is required for tracking control. Provision of such a fixed magnetic head brings about a problem with regard to its mounting position where downsizing the magnetic recording and reproducing apparatus is desired. There is proposed, accordingly, a method of automatic track finding (ATF) for controlling tracking of the rotary head by using only the reproduction output of the rotary head for reproduction without using a fixed head, which is employed, for example, in an 8 mm VTR. The ATF system is effective not only for downsizing and simplifying the mechanism, but also for automating the tracking adjustment and narrowing the tracks. The ATF system is expected to be employed in more and more apparatuses for tracking control henceforth.

In tracking control, it is important to enhance the response speed. It is a particularly important subject for the controllability of the VTR to shorten the required time (tracking lead-in time) from the stopped state of the tape until tracking is completed to become a stable state. This is because the tracking lead-in time occupies a large portion in the total time from the stopped state of the tape until the picture is reproduced or the splicing is started. Here, the term "splicing" denotes a continuation of recording from an end of a specific already recorded area. In particular, when splicing, if the operator presses the record button at a desired position, it takes a long time for the tape running to become stabilized. As a result, it is impossible to record at the desired moment, and a portion of the desired recording is not recorded.

Several methods have been proposed for shortening the tracking lead-in time. According to a certain method, for example, the moving distance from a specific position is detected and recorded when stopping, and the starting timing to the reference signal is adjusted depending on this distance.

In another example of using a control signal which is detected by a fixed head, as disclosed in Japanese Laid-open Patent 1-149266, in order to shorten the tracking lead-in time, always maintaining constant the relative position of the head and track recorded on the tape when stopping, the tape running start timing is synchronized with the head changeover signal so that the head may trace the track center in the starting transient and stationary state. In this example, by running the tape at low speed without phase control, the tape is stopped in a specified time after detecting the pulse of the control signal. As a result, the relative position of the head and the track is kept constant. This method of controlling the stopping position is applicable, in principle, also to the ATF system.

In the foregoing example, however, when stopping, it is necessary to execute a preparatory step of detecting and storing the running distance from a specific position, or stopping at a specific position precisely. In such stopping actions, a problem arises in that there are many elements influenced by fluctuations of the mechanism, that is, many uncertain elements. If the preparatory action cannot be effected right after the tape loading action, such rapid tracking lead,in is impossible. Without rapid tracking lead-in, the required time from the stopped state till the appearance of a picture or the start of splicing is extended, and incomplete recording occurs, particularly during splicing.

SUMMARY OF THE INVENTION

It is hence a primary object of the invention to present a signal reproducing apparatus capable of achieving tracking lead-in from a stopped state at high speed, on a tape in which data has been recorded together with pilot signals.

To achieve the object, a signal reproducing apparatus of the invention for reproducing data from a tape in which data and pilot signals for tracking have been recorded in oblique tracks comprises tape driving means for running the tape in its longitudinal direction, a rotary head for scanning the tape to produce a reproduction signal, reference generating means for generating a reference signal which is a rotation standard of the rotary head, tracking error detecting means for producing a tracking error signal from the pilot signals contained in the reproduction signal, and timing controlling means for controlling a start timing of the tape running of the tape driving means with respect to the reference signal based on the tracking error signal and the reference signal in a stopped state of tape running.

In this constitution, the position of the head relative to the oblique tracks on the tape in the tape running stopped state can be detected precisely, and the start of the tape driving means can be set at an optimum timing. As a result, right after starting or in the transient state, the head can trace the center of the track to be scanned. That is, tracking lead-in is achieved at a high speed.

BRIEF DESCRIPTION OF THE DRAWINGS

FIGS. 4(a) and 4(b) are diagrams showing the operation of a signal reproducing apparatus in an embodiment of the invention.

FIGS. 11(a)–11(c) are operation explanatory diagrams of a tracking number detector and a tracking error detector.

FIGS. 12(a) and 12(b) are operation explanatory diagrams of a timing controller shown in FIG. 9.

FIGS. 13(a) and 13(b) are operation explanatory diagrams of the timing controller shown in FIG. 9.

DESCRIPTION OF THE PREFERRED EMBODIMENTS

Figure 1:
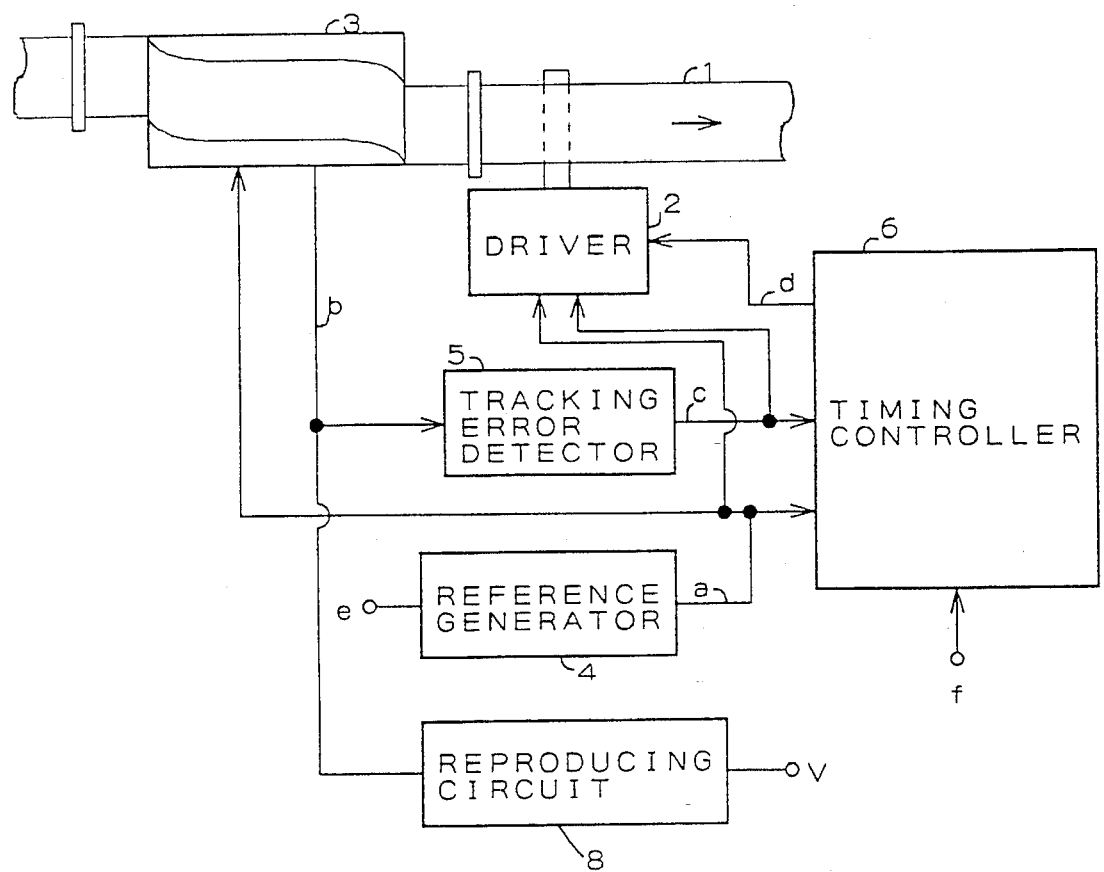
FIG. 1 is a block diagram of a signal reproducing apparatus in an embodiment of the invention.

FIG. 1 is a block diagram of a signal reproducing apparatus in an embodiment of the invention. In the drawing, numeral 1 denotes a tape, 2 is a tape driver, 3 is a drum, 4 is a reference generator, 5 is a tracking error detector, and 6 is a timing controller. In addition, numeral 8 is a reproducing circuit.

Figure 2:
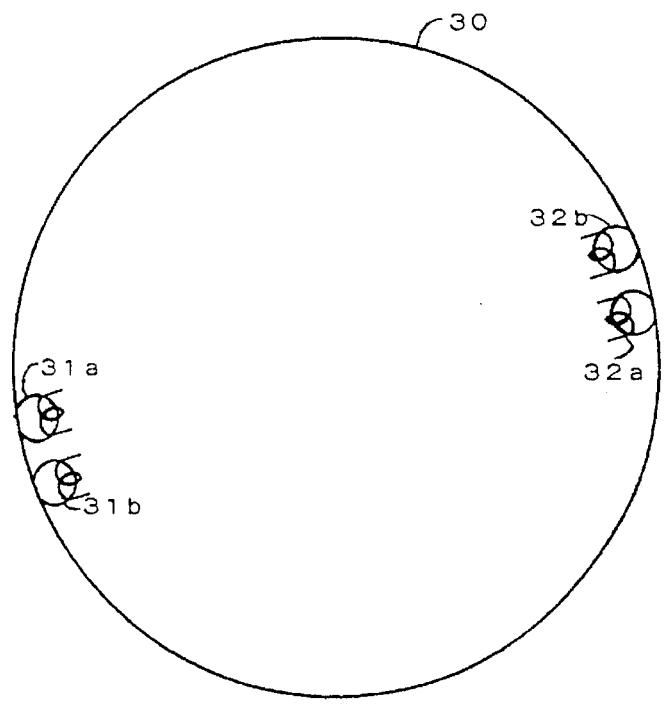
FIG. 2 is a diagram showing an example of a configuration of heads mounted on a drum main body.

The drum 3 includes, aside from the drum main body as required, a motor, a driving circuit for driving the motor, a rotation control circuit, heads mounted on the drum, and amplifying circuits for amplifying the read signals from the heads, among others. FIG. 2 shows the arrangement of heads mounted on a drum main body 30. Numerals 31a, 31b, 32a, 32b are heads, and in this embodiment two tracks are recorded and reproduced almost simultaneously by the heads 31a, 31b or 32a, 32b. Herein, the head 31a and head 32a possess an identical azimuth angle α, and are mounted on a same height oppositely across 180 degrees. The head 31b and 32b possess an identical azimuth angle β, and are mounted on a same height oppositely across 180 degrees. The azimuth angle α and the azimuth angle β are different from each other. The head 31b is installed very closely to the head 31a, and the head 32b very closely to the head 32a.

The drum rotates in synchronism with a reference signal a generated by the reference generator 4, and the data is read out by the heads mounted on the drum 3 from the tape 1 wound around the drum 3, and a reproduced signal b is issued. The tracking error detector 5 detects a tracking error signal c contained in the reproduced signal b, and feeds it into the timing controller 6. In the timing controller 6, on the basis of the tracking error signal c, the start timing for establishing tracking in a short time is calculated as mentioned below. When a start command is externally given to the terminal f, a drive start command d is applied to the tape driver 2 at the calculated start timing. In the reproducing circuit 8, the reproduced signal b is converted into ordinary data. This method depends on the recording method of data on the track, and is not specifically described herein. Generally, it is composed of clock extraction from the reproduced signal, data reproduction (binary coding), and demodulation. The data is delivered from the terminal v.

Figure 3:
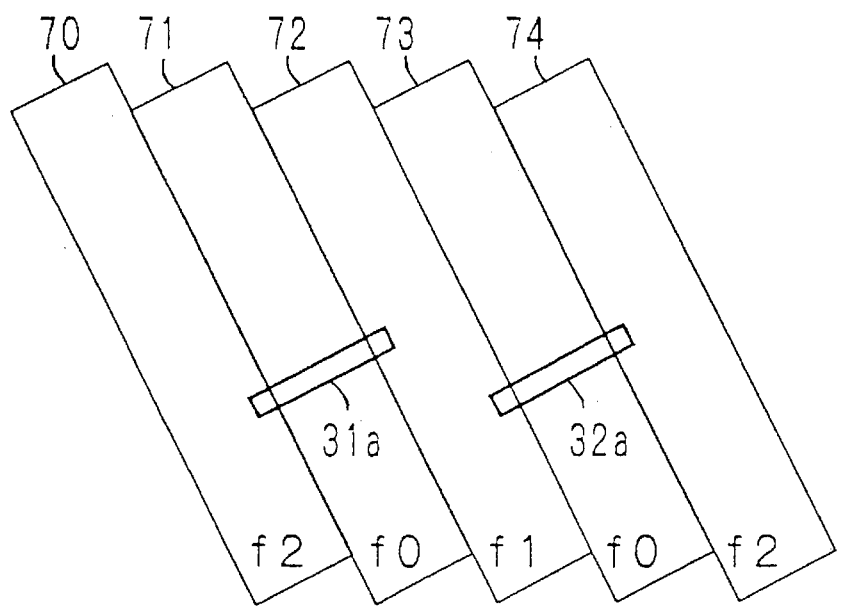
FIG. 3 is a track composition diagram in an embodiment of the invention.

The tracking method conforming to the embodiment is described below. Herein, as shown in FIG. 3, it is supposed that data is recorded sequentially from track 70, in f2 track, f0 track, f1 track, f2 track, f0 track, f1 track, and so forth. In f0 track, a pilot signal is not recorded. In f1 track, a pilot signal of frequency f1 is recorded. In f2 track, a pilot signal of frequency f2 is recorded. That is, in four track periods, two different kinds of pilot signals are recorded in every other track. The pilot signals are recorded by frequency multiplexing, or digitally, and the frequencies are selected to be low so as to be less affected by the azimuth loss. At the same time, the tracking is controlled so that the heads 31a, 32a may always scan the f0 track. Supposing the head 31a scans the track 71, leakage components of different pilot signals f1, f2 recorded in both adjacent tracks (track 70 and track 72 in this case) are detected together. From these signals, a tracking error signal c is detected by the tracking error detector 5, and a capstan motor is controlled by the tape driver 2 in response to the input tracking error signal c. The tracking error detector 5 herein is a known detector for comparing the magnitude of the f1 component and the magnitude of the f2 component, and issuing a tracking error signal proportional to the magnitude difference therebetween. As the tracking error signal c of the tracking error detector 5, a value obtained by subtracting the f2 component from f1 component is produced. The head 31b is installed very closely to the head 31a, and therefore the relative position with the head 31a can be accurately maintained, and therefore by tracking the head 31a on the track 71, tracking of head 31b on the track 72 is achieved at the same time. Similarly, by tracking the head 32a on the track 73, tracking of head 32b on the track 74 is achieved.

The tape driver 2 receiving the drive start command starts tape driving, and controls tracking so that the head may track the track on the tape. However, when applied in tracking, the polarity of the tracking error signal from the tracking error detector 5 must be changed over so that the value may be proportional to the result of subtracting the magnitude of the pilot component of the succeeding track from the magnitude of the pilot component of the preceding track. This polarity changeover is conducted according to the reference signal a of the reference generator. For example, this reference signal a is a signal of the same frequency as the rotating frequency of the drum main body, and when the reference signal is a=H (H shows the high potential state), the heads 31a, 31b record and reproduce f0 track, f1 track, and when the reference signal is a=L (L shows the low potential state), the heads 32a, 32b record and reproduce f0 track, f2 track, and in such system, the correspondence of polarity of the tracking error signal c to the state of the reference signal a is attained. In the case of this embodiment, as the output of the tracking error detector 5, the value proportional to the result of subtracting the magnitude of f2 component from the magnitude of f1 component is delivered, the polarity of the tracking error c must be inverted in the case of reference signal a=L. The tape driver 2 comprises, as required, a motor, a capstan for transmitting its rotation to the tape, a motor driving circuit, a rotation control circuit, and others. Likewise, changeover of polarity of the tracking error signal is also effected generally within the tape driver 2.

In the case that the reproduction standard is present outside of the apparatus, such as the case of splicing, a reference signal is entered to an input terminal e from an external source. In the reference generator 4, an internal clock is synchronized in phase with the external reference signal by phase locked loop or the like. As a result, the reference generator 4 generates a reference signal in synchronism with the external reference signal, and external synchronization is realized.

Explained next is the outline of operation until starting when a start command is given from the tape stopped state by reference to FIG. 4. FIG. 4(a) represents the reference signal indicated by a in FIG. 1, and FIG. 4(b) denotes the tape running state in FIG. 4(b), (1) is the tape stopped state, (2) is the state waiting for a start timing after a start command is given, and (3) is the state upon starting tape running. Processing in each state is explained below.

(1) Tape stopped state

The processing is 1. to detect tracking error and convert it to a stopping position, and 2. to calculate a start timing depending on the stopping position.

(2) Start timing wait state

After input of the start command, this processing is to wait until the timing calculated in (1) in a stopped state. In this example, assuming reproduction using the same head as the head used in recording, it is designed to wait up to the timing (t_IN) scanned by the specified head. The operation starts in time t1 after time t_IN (time t_ST).

(3) Tape running start

Hereinafter, the tape is started to control tracking.

The individual details are explained below. First, the method of detecting the stopping position from the tracking error signal is explained.

Figure 5A:
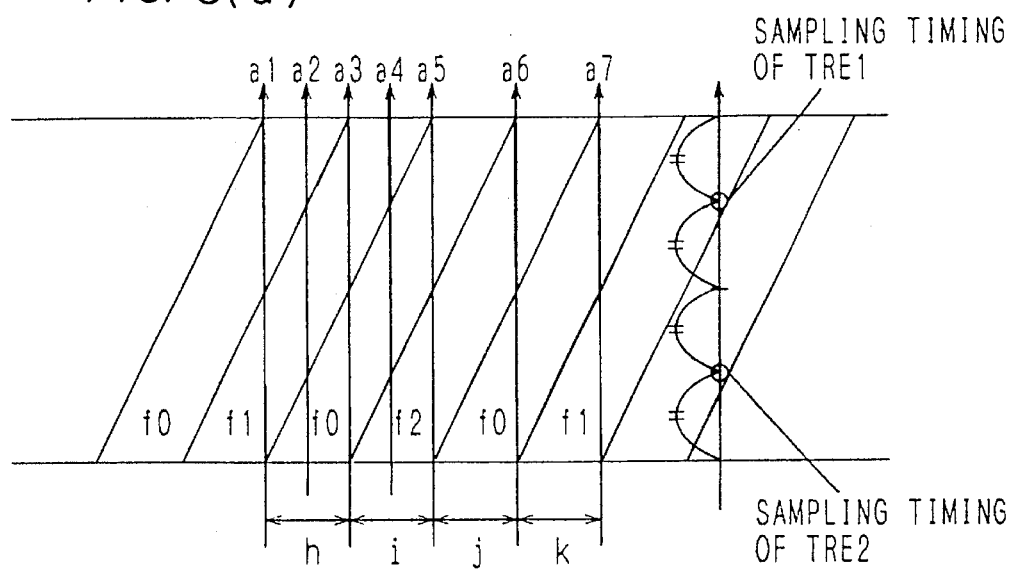
FIGS. 5(a)–5(c) are explanatory diagrams of the operation of a tracking error detector and stopping position detecting method using a tracking error signal.
Figure 5B:
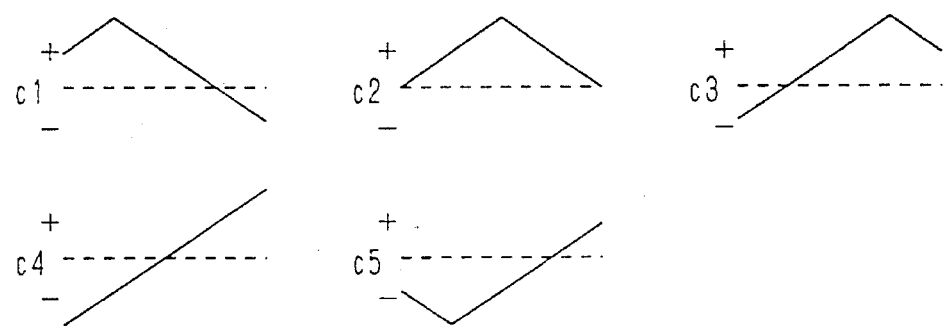

FIG. 5 schematically shows the tracing of heads corresponding to the tape position, and the tracking error signal of the tracking error detector 5 at that time, in several different stopping positions. In FIG. 5(a), a1 to a7 show the head tracings on the tape 1. For the ease of understanding, however, in the diagram, it is modified so that the head tracing may be vertical. In FIG. 5(b), c1 to c5 show the tracking error signal outputs at different stopping positions. Incidentally, the output of the tracking error signal corresponding to the head tracing a1 is c1, and that corresponding to the head tracing a2 is the tracking error signal output c2, and those having same subscripts 1 to 5 correspond to each other. As the tracking error signal, the value proportional to the result of subtracting the magnitude of f2 component from the magnitude of f1 component of the pilot signal is delivered. Furthermore, the tracking error with respect to the position is indicated in the drawing in a similar form to a triangular wave. The output when the head is positioned in the center of f0 track is 0 (on the broken line).

Figure 5C:
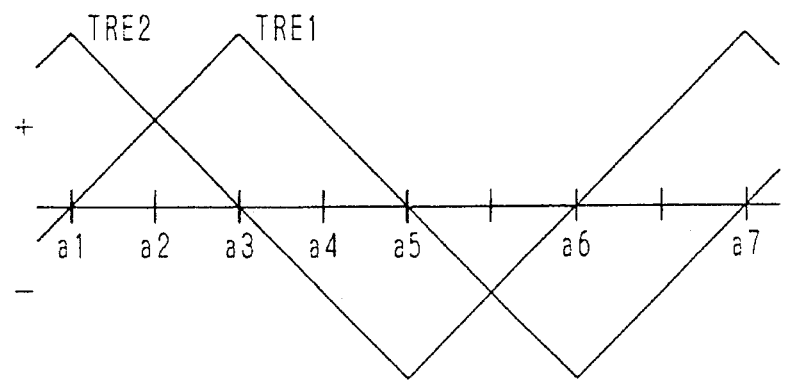

FIG. 5(c) is a plot of a tracking error signal TRE1 sampled in the timing after scanning three sections by dividing one scanning period into four equal sections and a tracking error signal TRE2 sampled in the timing after scanning one section by varying the stopping position (a1 to a7 in FIG. 5(a)). The specific sampling timing in one scanning period is as shown in FIG. 5(a).

As for TRE1, it is known that the polarity is positive at the stopping position where the head tracings on the tapes are a1 to a5. At stopping positions a5 to a7, like-wise, the polarity of TRE1 is known to be always negative.

Concerning TRE2, the polarity is positive when the head tracings on-the tape are a1 to a3, and negative, a3 to a5. At stopping positions between a5 and a7, it is known that the polarity is inverted at the intermediate a6.

Therefore, by investigating the combination of polarities of TRE1 and TRE2, the stopping position of the pilot signal within four tracks corresponding to the recording period can be detected at a precision of within ± 0.5 track. In the example shown in FIG. 5, it is detected to be stopping at (1) a1 to a3 (the range indicated by h in FIG. 5) if TRE1: +, TRE2: +, (2) a3 to a5 (the range indicated by i in FIG. 5) if TRE1: +, TRE2: −, (3) a5 to a6 (the range indicated by j in FIG. 5) if TRE1: −, TRE2: −, and (4) a6 to a7 (the range indicated by k in FIG. 5) if TRE1: −, TRE2: +.

Thus, by checking the polarity of tracking error sampled at a specific timing, the stopping position in the recording period of pilot signals can be detected. Of course, herein, by using tracking error signals sampled at different timings from TRE1, TRE2 above, the boundaries of detection may be set arbitrarily.

This method detects the position by using the polarity of tracking error sampled at a specific timing, but supposing that the gain of the tracking error signal, that is, the signal level corresponding to the off-track extent to be almost constant, the position detecting precision may be further enhanced. According to the example shown in FIG. 5, stopping in a range of a1 to a3 or a3 to a5 can be detected by the polarity of TRE2, but it is also possible to distinguish the range of a1 to a3 further into a1 to a2, and a2 to a3, by comparing TRE2 with a certain specific level.

Generally, however, the gain of the tracking error signal is large in fluctuation, and the method of detecting the position by comparing a tracking error signal with the specified level is not always free from problems in reliability. To the contrary, the method of detecting the position by the polarity of tracking error mentioned above does not depend on fluctuation of the gain of tracking error, so that the reliability is high.

When sampling the tracking error, by sampling plural times near the desired timing, adverse effects due to the noise contained in tracking error may be reduced. For example, there is known a method of using the mean of the levels of tracking error signals sampled plural times near the desired timing in the position detection. Also, in the method of detecting position by polarity, of the plural times of sampling, the polarity is judged by the majority, and the position is detected. In any event, by using the tracking error by sampling plural times near the desired timing, detection errors due to noise can be reduced.

Furthermore, in the condition that the head is scanned plural times while tape running is stopped, the polarity may be judged by sampling the tracking error at a desired timing by the same number of times and obtaining the mean.

Referring next to FIG. 6, other method of detecting the stopping position by tracking error is explained. As shown in FIG. 6(a), one scanning period of the head is divided into a first half and a second half (B, A in FIG. 6(a)), and the mean of tracking error signals (TRE) in the two sections is determined. The results are supposed to be Sb, Sa. Assuming the head position at the end of one scanning when stopping to be $\theta$ ($0 \leq \theta < 2\pi$, the correspondence of position $\theta$ and position on the tape as shown in FIG. 6(a)), since the head scanning tracing when stopping crosses two tracks, the head position at the scanning start point is $\theta + \pi$.

Here, supposing that the tracking error signal TRE can be expressed as TRE=Ae●sin $\theta$, $$Sa + Sb = \int_{\theta}^{\theta+\pi} Ae \cdot \cos\theta = 2Ae \cdot \cos\theta \qquad (1)$$

$$Sa - Sb = \qquad (2)$$

$$\int_{\theta}^{\theta+\pi/2} Ae \cdot \sin\theta d\theta - \int_{\theta+\pi/2}^{\theta+\pi} Ae \cdot \sin\theta d\theta = 2Ae \cdot \sin\theta$$

then

-continued $$\theta = \tan^{-1}\left[\frac{\sin\theta}{\cos\theta}\right] = \tan^{-1}\left[\frac{Sa - Sb}{Sa + Sb}\right] \quad (3)$$

Thus obtained stopping position θ is not influenced by the noise components contained in the tracking error signal, and not influenced by the gain of the tracking error signal. Hence, as compared with the method shown above, the detection precision of stopping position is excellent, and the reliability is higher.

Figure 6A:
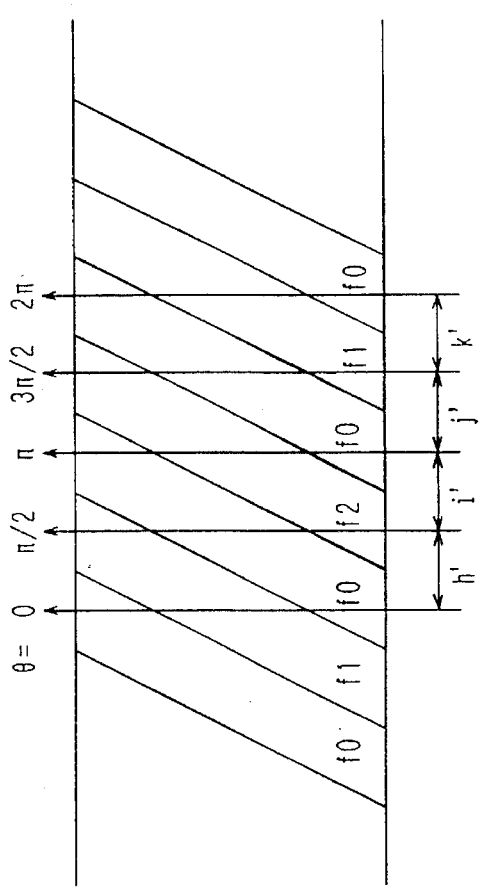
FIGS. 6(a)–6(d) are explanatory diagrams of another stopping position detecting method using a tracking error signal.
Figure 6C:
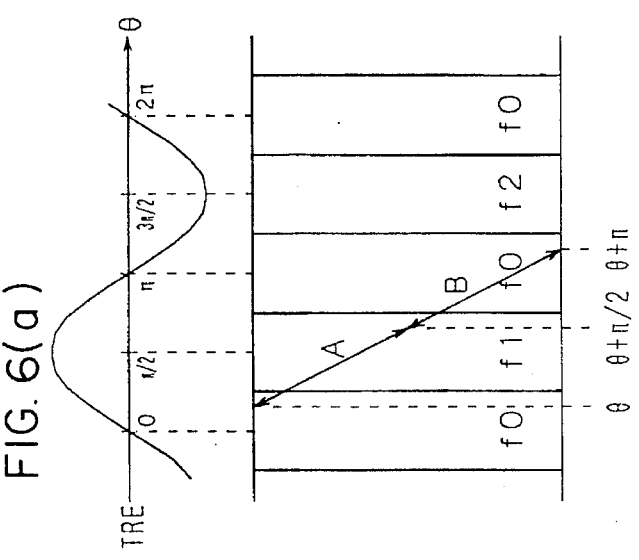
Figure 6B:
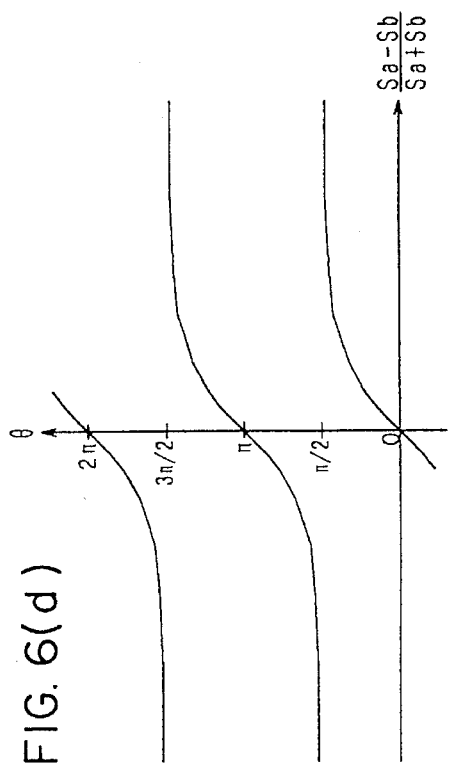
Figure 6D:
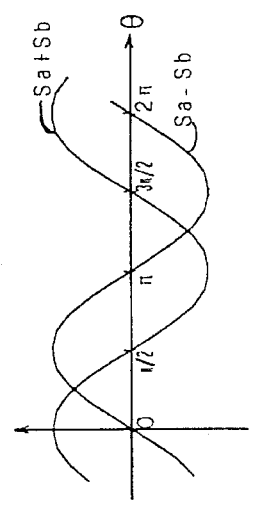

The method for obtaining an equivalent precision as that of the stopping position detection method shown in FIG. 5 is explained by reference to FIGS. 6(b), (c). Supposing the head position at the end of one scanning when stopping the tape to be θ (0≦θ<2π), (Sa+Sb), (Sa−Sb) expressed in formulas (1), (2) are shown in FIG. 6(b). At this time, by the combination of polarity of (Sa+Sb) and (Sa−Sb), it can be divided into four cases: 1. (Sa+Sb): +, (Sa− Sb): +, 2. (Sa+Sb): −, (Sa−Sb): +, 3. (Sa+Sb): −, (Sa− Sb): −, and 4. (Sa+Sb): +, (Sa−Sb): −. It is detected that case 1 is stopped in a range of h' in FIG. 6, case 2 in a range of i', case 3 in a range of j', and case 4 in a range of k'. That is, as in the case above, the stopping position within four tracks corresponding to the recording period of the pilot signals can be detected at a precision of ±0.5 track. This is, however, only an example, and when combined with the head position θ expressed in formula (3) as shown in FIG. 6(d), the stopping position may be detected at higher precision. By θ expressed in formula (3) alone, the position can be detected only in two tracks, but when combined with the polarity of (Sa+Sb), (Sa−Sb) expressed in formulas (1), (2), the stopping position in four tracks can be detected more precisely.

Figure 7A:
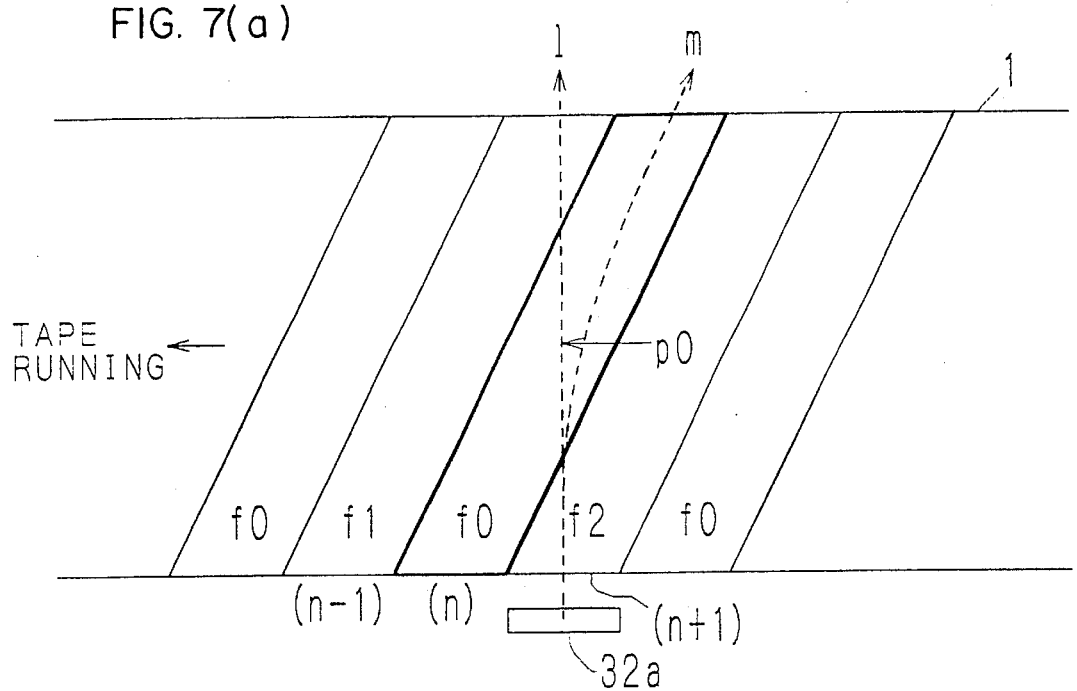
FIGS. 7(a) and 7(b) are operation explanatory diagrams of a timing controller shown in FIG. 1.
Figure 7B:
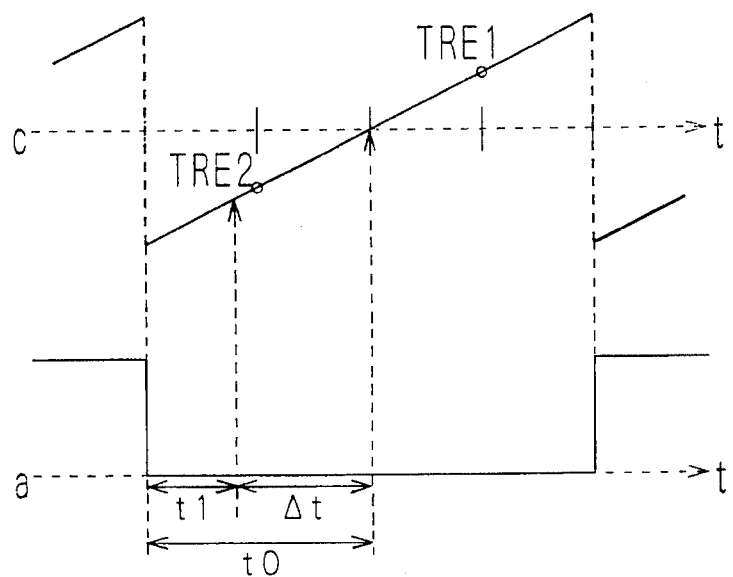

The detecting method of stopping position has been explained. Next is described the process of determining the starting timing from the detection of stopping position in further detail by referring to FIG. 7. In FIG. 7, numeral 1 is a tape, 32a is a head, 1, m are head tracings, and c is a tracking error signal. As mentioned later, 1 is the head tracing when stopping, and the head 31a (not shown) and head 32a move in the same tracing 1 when stopping.

The start timing is determined by a timing controller 6. The timing controller may be easily composed in hardware, but herein, as an example of realizing the same by software, its operation is explained as a series of proceedings. The timing controller 6 executes the following three steps.

(Step 1): In head scanning while stopped, the stopping position is detected by detecting the tracking error signal. Conversion from tracking error signal to stopping position is possible by the methods as mentioned above, but in any method, since the pilot signal is recorded in four tracks, the position can be detected within the four tracks. Scanning of the head is done in synchronism with the reference signal which is the rotation standard of the drum, and when the stopping position is detected, it is possible to know the timing of scanning the center of the track to have the head on a track when stopping. This timing is set as the start timing.

(Step 2): The timing in consideration of the allowance for a specific time required for starting up the tape driver 2 from the timing for scanning the center of the track to place on a track when stopping is the final start timing.

(Step 3): Waiting until the start command is given, the drive start command is issued at the timing determined at (Step 2).

These steps are explained according to the example in FIG. 7. The stopping position detection from the tracking error signal refers to the case of employing the method shown in FIG. 5.

(Step 1): The tracking error is as shown in c in the diagram when stopped at the position conforming to tracing 1. The polarity of the tracking error TRE1 sampled at the timing of ¾ of scanning period is positive (+), and the polarity of TRE2 sampled at the timing of ¼ of scanning period is negative (−), and it is track (n) that is on track, but it is known that it is stopped at a position closer to track (n−1) than the stopping position in FIG. 8 as described below. In this embodiment, for the track (n) in the arrangement of pilot signals as shown in the diagram, tracking is effected to scan with head 32a, not head 31a, and therefore it is the rough starting timing When the reference signal a is a=L in the reference generator 4.

The position of the head tracing the center of the track (n) is p0 on the track pattern in FIG. 7, and its timing is after time t0 from the edge of the reference signal a. This timing is the same as the timing when the tracking error signal is 0, and it can be detected by a circuit composed of a known comparator or the like.

Herein, however, by the polarity of TRE1 and polarity of TRE2, the stopping position is detected at a precision of ±0.5 track, and the start timing is determined on the basis of the most typical position in the range. In this way, a nearly optimum start timing can be determined.

(Step 2): If the tape driver 2 can instantly start up the tape to the stationary speed, it can be put on track directly by starting at the timing determined in (Step 2). Actually, due to inertia of the tape driver 2, a certain time is needed until the tape reaches the stationary speed. Therefore, considering a corresponding allowance At, the final start timing is determined. This timing is after time t1 from the edge of the reference signal a. When starting up, since the head 32a must scan the track, it is after time t1 from the trailing edge of the reference signal a.

(Step 3): A driving start command is issued at the timing of (Step 2), waiting for the externally supplied start.

As a result, the head tracing after starting is as indicated by broken line m, so that the target track can be traced immediately after starting up.

Figure 8A:
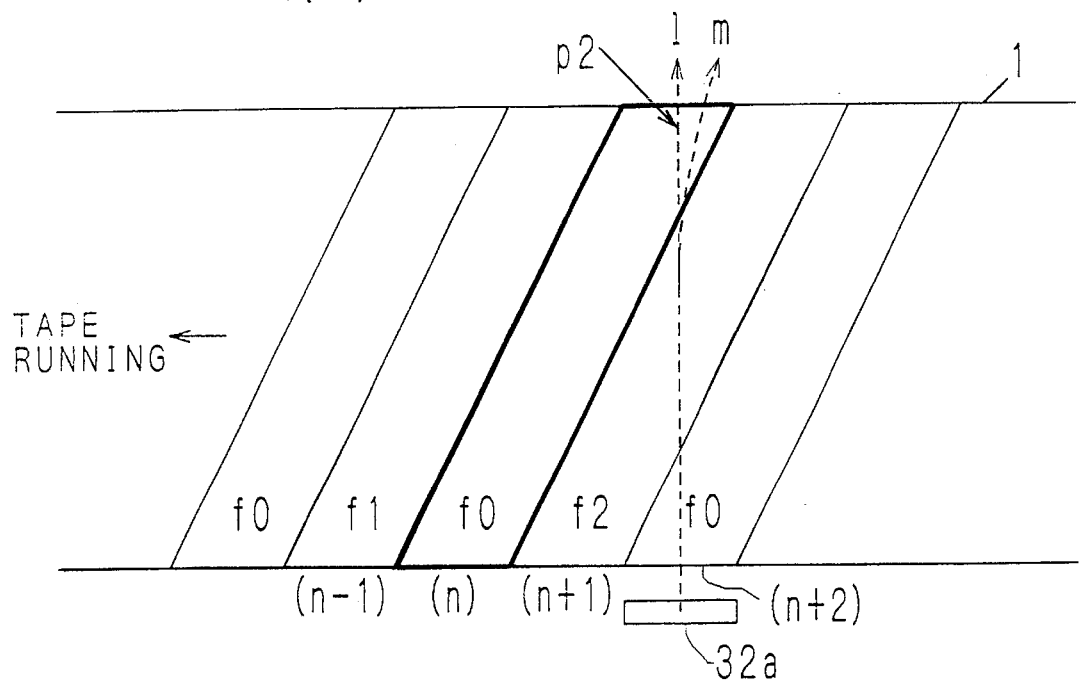
FIGS. 8(a) and 8(b) are operation explanatory diagrams of the timing controller shown in FIG. 1.
Figure 8B:
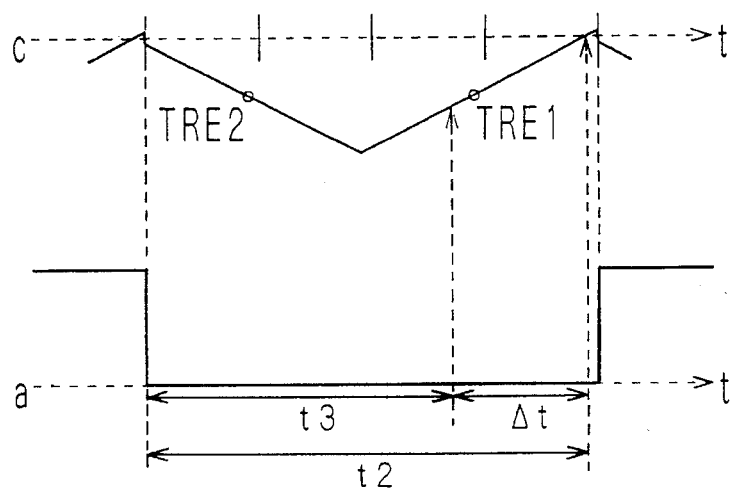

FIG. 8 shows the operation of the timing controller 6 at other stopping position. In this case, the head scanning being stopped crosses two f0 tracks, but considering the required time until speed lead-in of tape running, track (n) is supposed to be the track to be set on track. If, moreover, the recording pattern of pilot signal is the same as in the case in FIG. 7, the polarity of TRE1 is negative (−), and the polarity of TRE2 is also negative (−). The track to be set on track is track (n) as in FIG. 7, but it is known that it is stopped at a position closer to track (n+1) than in FIG. 7. Hence, at point p2 (after time t2 from edge of reference signal a on time axis) remote from the start end of scanning period than the above point p0, the head is scanning nearly the center of track (n), and it is regarded as an ideal starting position, and the timing back from this by the start time portion is the actual start timing. In other words, as shown in the diagram, the actual start timing is after time t3 from the edge of the reference signal a. In this case, too, the edge is a trailing edge as shown in FIG. 7.

As-explained herein, in the example shown in FIGS. 7 and 8, the time from the trailing edge of the reference signal till startup is set at t1 or t3 depending on the detected position, and on-track is achieved, as a result, in a Shorter time on the same track (track (n) in FIGS. 7, 8). That is, by detecting the stopping position by the tracking error signal, when it is controlled to vary the start timing from the reference signal, the track to be set on track right after start can be scanned, and the time until completion of tracking may be substantially shortened.

Herein, in the foregoing examples, the stopping position is detected by detecting the polarity of TRE1 and TRE2, and the start timing is varied depending on the detected stopping position, but as mentioned above, the detecting precision of the stopping position can be further enhanced by detecting the level of the tracking error sampled at a specific timing, and it is possible to vary the start timing depending on the stopping position. Also, as shown in FIG. 6, the detected tracking error signal may be calculated, and the stopping position may be detected at higher precision. In these cases, when the optimum start timing is determined depending on the detected stopping position, needless to say, the time until tracking may be further shortened.

One of the problems encountered when detecting position by using tracking error signal is the offset included in the tracking error signal taken in by the timing controller. This offset is derived from the offset between the reference voltage in the output unit of the tracking error detector and the reference voltage in the input unit of the timing controller. To eliminate the effect of this offset, it is first necessary to detect its magnitude. Once the magnitude of the offset is known, it is easy to correct. As an example of detecting the magnitude of offset, the following method is considered. First, by reproducing ordinarily when turning on the power source, a tracking error signal is taken in at this time within the timing controller. Since the tracking is controlled at this time, if the offset is not included, the tracking error signal will be 0 (reference voltage). The magnitude of tracking error signal taken in at this time is the offset portion.

The embodiment is an example of realizing the invention, and various applications are possible. The step for determining the start timing in the timing controller is also an example, and the process itself is not particularly limited.

For the track to be set on track, meanwhile, it is shown to reproduce using the same head as the one used in recording, but it is not necessary to reproduce using the same head as the one used in recording, and in such a case it is not necessary to wait for the timing until the head recording the track to be set on track returns to the scanning point. In the embodiment, four heads are mounted on the drum, but the number of heads and configuration are not limited.

Instead of realizing the timing controller by software, it may be realized by equivalent hardware.

Explained next is a case of multi-segment recording in which one frame is divided into plural tracks. In a digital VTR or the like, as compared with the analog VTR, the quantity of information to be recorded increases. Therefore, information of one frame is divided and recorded in plural tracks. In the case of multi-segment recording, the track numbers for distinguishing the tracks are recorded in the tracks on the tape, and by detecting them, generally, it is synchronized with the frame reference. This is explained by reference to FIG. 9.

Figure 9:
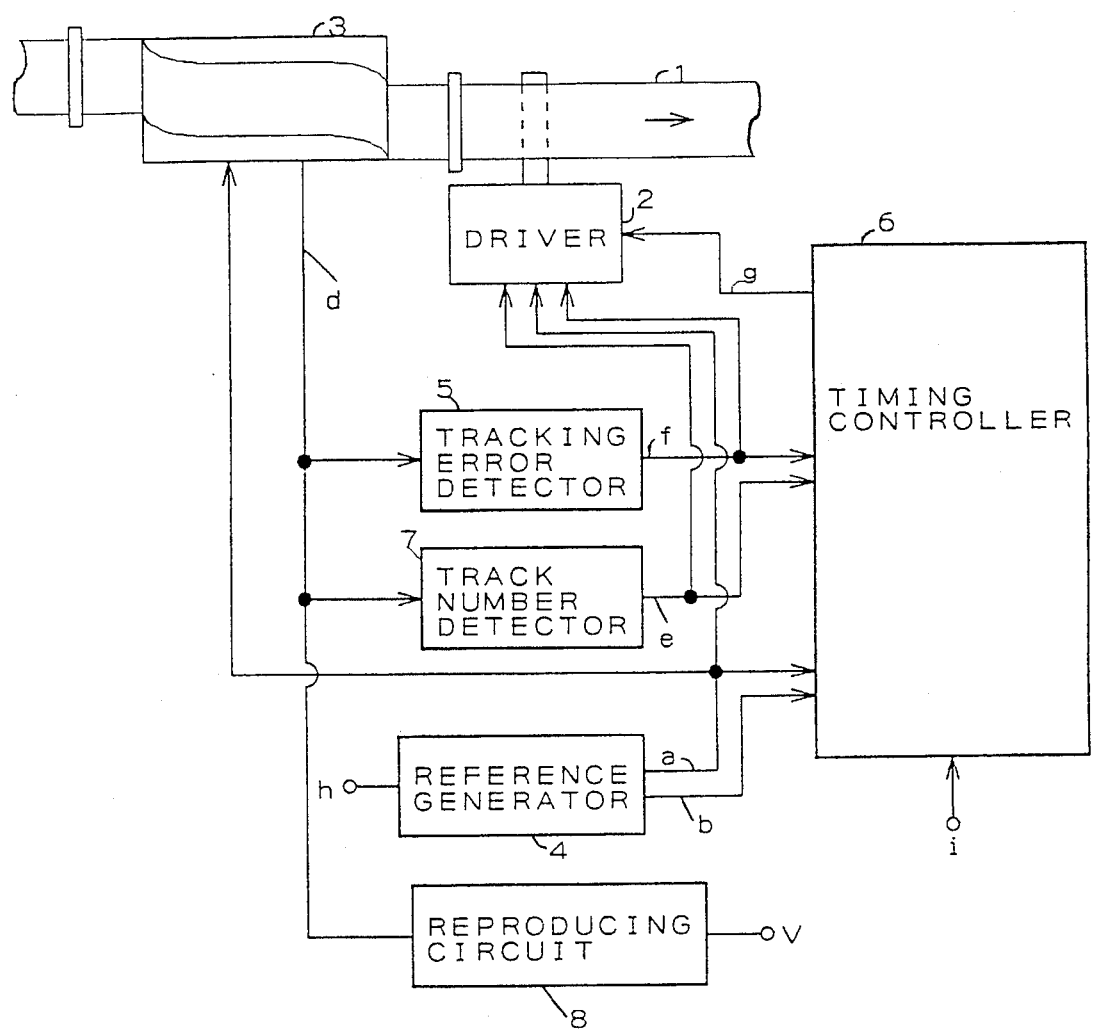
FIG. 9 is a block diagram of a signal reproducing apparatus in another embodiment of the invention.
Figure 10:
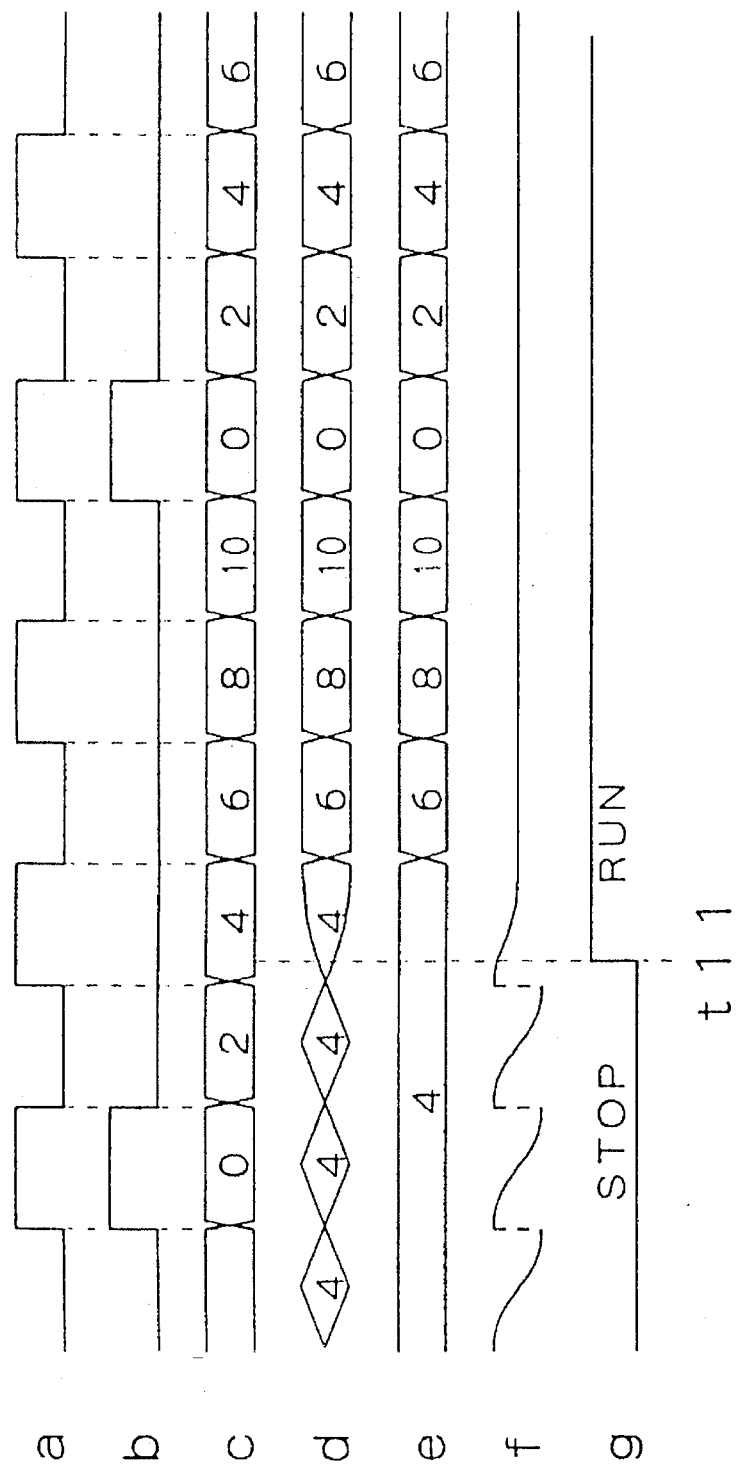
FIG. 10 is a time chart showing signals of components shown in FIG. 9.

FIG. 9 is a block diagram of a signal reproducing apparatus in other embodiment of the invention. In the diagram, numeral 1 is a tape, 2 is a tape driver, 3 is a drum, 4 is a reference generator, 5 is a tracking error detector, 6 is a timing controller, and 7 is a track number detector. Also, numeral 8 is a reproducing circuit, and reproduced data is delivered through a terminal v. The operation of the thus composed signal reproducing apparatus is described in detail below while referring to the time chart in FIG. 10. In FIG. 10, a, b, d, e, f, g represent the contents of the signal lines indicated by the same symbols in FIG. 9. In this embodiment, data of one frame is divided and recorded into 12 oblique tracks.

The drum 3 comprises, aside from the drum main body, a motor and a driving circuit for driving it, a rotation control circuit, heads mounted on the drum, an amplifier for amplifying the read-in signals from the heads and other components as required, as in the foregoing embodiment shown in FIG. 1. FIG. 3 shows the configuration of heads mounted on the drum main body 30. Numerals 31a, 31b, 32a, 32b are heads, and this embodiment also relates to an example of recording and reproducing two tracks almost simultaneously by the heads 31a, 31b, or 32a, 32b. The drum 3 rotates in synchronism with the reference rotation signal a generated by the reference generator 4, and reads the data from the tape 1 wound on the drum 3 by the heads mounted on the drum 3, and delivers a reproduced signal b. In the initial state, supposing the tape to be in stopped state, head scanning by the drum 3 is effected in a form of crossing the tracks on the tape. Assuming azimuth recording, signals of adjacent tracks cannot be read, and the recorded signal amplitude varies as shown in the diagram. In FIG. 10, d denotes are produced signal read by the heads 31a, 32a, and the numeral shown in the reproduced signal d represents the track number recorded on the track in reproduction.

The track number detector 7 extracts a track number from the reproduced signal d, and sends out a reproduction track number e. In the tracking error detector 5, a tracking error signal f is detected from the input reproduced signal. In the timing controller 6, the reference track number c is internally created from the reference frame signal b and reference rotation signal a given from the reference generator 4. This reference track number shows the track number to be reproduced at that point. In this case, being 0 at the beginning of the reference frame signal, it is a series of numerals counting up simply till the end of the frame sequentially. Comparing the reference track number c and the reproduced track number e indicating the tape stopping position, and further on the basis of the tracking error signal sampled at a specific timing in one head scanning while stopped, the start timing for setting on track in a short time and synchronizing the frame at the same time is calculated. When a start command is externally given to terminal i, at the calculated start timing, or at t11 in FIG. 10 in this case, a drive start command g is given to the tape driver 2.

The method of tracking is as explained above. In this embodiment, however, as shown in FIG. 11(a), it is supposed data are recorded sequentially from track number 0 in f0 track, f1 track, f0 track, f2 track, f0 track, f1 track, and so forth. The tracking is controlled so that the heads 31a, 32a may always scan f0 track.

Receiving a drive start command, the tape driver 2 starts tape driving, and controls tracking so that the heads may trace the tracks on the tape.

Herein, since the start timing is appropriately measured, the reference track number and the reproduction track number coincide right after startup. That is, synchronism of the reference frame and reproduction frame is achieved without any assistance.

In the case a frame reference is present outside the apparatus, such as the case, of splicing, a reference frame signal is externally entered in an input end h. In the reference generator 4, the internal clock is synchronized in phase by PLL or the like with respect to the external reference signal. As a result, the reference generator 4 generates signals in synchronism with external reference signal, so that external synchronism is realized.

The operation of the track number detector 7 and tracking error detector 5 is explained by reference to FIG. 11. First, as for the portion of the track number detector 7 for detecting the reproduction track number, since its specific composition depends on the recording method of track numbers on the tracks, the detail thereof is not described herein. Generally, it is composed of extraction of a clock from reproduced signals, data reproduction (binary coding), synchronism detection, and extraction of track number information buried in specific position in the data.

FIG. 11 schematically shows the head tracing on the tape position, input and output of the track number indicator 7 at this time, and the tracking error signal of the tracking error detector 5 at this time, at several different stopping positions. In the diagram (a), a1 to a5 represent the head tracings on the tape 1. For the ease of understanding, the diagram is modified so that the head tracing may be vertical. By contrast, reproduced signals are b1 to b5. Subscripts 1 to 5 after b correspond to those of a. Receiving this reproduced signal, the track number is detected, and its output is possible in various forms. Herein, the track number is supposed to be detected by the heads 31a, 32a. That is, the track number to be detected is always an even number. Incidentally, c1 to c5 are examples of direct output of the detected values, and the x-marked period is narrow in the input amplitude in which track number cannot be detected. In this case, the output information quantity is the greatest, but, as mentioned later, since the timing controller 6 should be preferably composed of software by a microprocessor or the like, there are limits in the processing time at the transmitting and receiving side. Generally, as shown in d1 to d5, the last detected track number in one scanning period is sent to the next scanning period. In this case, as the data, there is only one scanning, and it is advantageous in the aspect of processing in the timing controller.

By the way, e1 to e5 denote the tracking error signal output at each stopping position. Herein, the value proportional to the result of subtracting the magnitude of f2 component from the magnitude of f1 component of the pilot signal is produced. When the head is completely in on-track state, the output is 0 (on broken line).

FIG. 11(c) is a plot of tracking error signal TRE1 sampled at the timing after scanning one period in the case of dividing one scanning period into four sections, and tracking error signal TRE2 sampled at the timing after scanning three sections, by varying the stopping position (a1 to a7 in FIG. 11(a)).

Speaking of TRE1, in the case of stopping position where the head tracings on the tape are a1 to a5, it is known that the polarity is positive. At stopping positions in a range of a5 to a7, the polarity of TRE1 is always negative. Hence, if the detected track number is at such stopping positions as 0, 4, 8, if the stopping position varies within this range, the polarity of TRE1 is always positive. Likewise, at stopping positions where the detected track number is 2, 6, 10, if the stopping position varies within the range, the polarity of TRE1 is always negative.

As for TRE2, it is known that the polarity is negative when the head tracings on the tape are a1 to a3, and positive when a3 to a5. At stopping positions between a5 and a7, it is known that the polarity is inverted at the intermediate a6.

Therefore, by investigating the combination of polarities of TRE1 and TRE2, the stopping position of the pilot signal within four tracks corresponding to the recording period can be detected at a precision of within ± 0.5 track. In the example shown in FIG. 11, it is detected to be stopping at (1) a1 to a2 if TRE1: +, TRE2: −, (2) a3 to a5 if TRE1: +, TRE2: +, (3) a5 to a6 if TRE1: −, TRE2: +, and (4) a6 to a7 if TRE1: −, TRE2: −.

Thus, by checking the polarity of tracking error sampled at a specific timing, the stopping position of the pilot signal in the recording period can be detected as in the preceding embodiment. Of course, herein, by using a tracking error sampled at different timings from TRE1, TRE2 above, the boundaries of detection may be set arbitrarily. In the foregoing embodiment, incidentally, the stopping position may be detected also by employing the method explained in FIG. 6.

Also, when using the polarity of TRE2 in the detection of stopping position together with the detected track number, the stopping position within the frame may be detected at a precision of ±1 track by the detection of the track number, and by the polarity of TRE2 at this time, moreover, the detection precision may be improved two times (±1 track to ±0.5 track). In the example shown in FIG. 11, by detecting the track number 4, it is known that the stopping position is in a range of a1 to a5, and by detecting the polarity of TRE2, it is known whether the stopping is in a range of a1 to a3, or a3 to a5.

Of the operation of the timing controller 6, referring to FIG. 12, the process for determining the start timing is further described below. The Operation for generating the reference track number is as explained by reference to FIG. 10 and its explanation is omitted herein. In FIG. 12, numeral 1 is a tape, 31a is a head, a, b are head tracings, and c, d are reproduced signal and detection signal of reproduction track number. Also, e is a tracking error signal. The timing controller 6 may be easily composed of hardware, but herein, as an example of realizing the same by software, its operation is explained as a series of procedures. The timing controller 6 executes the following four steps. In the initial state, the tape is supposed to be in stopped state.

(Step 1): Of the track numbers detected from reproduced signals, the last detected track number (n) is judged to be the track to be set on track, and the scanning period when the reference track number is (n) is the approximate start timing.

(Step 2): In head scanning in stopped state, a tracking error is sampled (TRE2 mentioned above) at the moment corresponding to ¾ of the scanning period, and the start timing is set by its polarity. By the polarity of TRE2, if the same track number (n) is stopped at the position to be detected, it is judged if the stopping position is closer to track number (n+1) or to track number (n−1). Depending on this stopping position, the on-track timing differs, and hence the start timing is changed. Herein, since the pattern of the pilot signal is known by the track number detected in (Step 1), the relation between the polarity of TRE2 and stopping position is also known. The detail of relation is as shown in FIG. 11(c).

(Step 3): By considering an allowance for specified time required for startup of the tape driver 2 from the on-track timing the final start timing is determined.

(Step 4): Waiting until a start command is given, the drive start command is issued at the timing determined in (Step 3).

These steps are explained by reference to the example in FIG. 12.

(Step 1): In the tape running stopped state, the heads 31a, 32a are scanning by crossing the tracks in the tracing a indicated by single dot chain line on the tape 1. In this case, assuming two-channel reproduction, two tracks are crossed. The envelope of the reproduced signal at this time is as shown in c, and the track number detected by the track number detector 7 therefrom is as indicated by d. The x-marked region in d is low in the level of reproduced signal, and hence high in error rate, and therefore it is a region in which track number cannot be detected. In this case, only one track number is detected, and the track (n) indicated by the thick line is the track to set the head on track. Therefore, the scanning period in which the reference track number is (n) is the approximate timing of output of the drive start command.

(Step 2): If the correspondence of the track number and the pattern of the recorded pilot number is known to be as shown in the diagram, the tracking error when Stopped at a position of tracing a is as in e in the diagram. Therefore, the polarity of the tracking error TRE2 sampled at the timing of ¾ of scanning period is positive, and it is known to be stopped toward track (n−1) as compared with the stopping position in FIG. 13 mentioned below.

The position where the head is completely on track (n) is p10 on the track pattern in FIG. 12, and its timing is t10 on the time axis. This timing varies with the stopping position. It is hence necessary to detect the stopping position precisely. In the embodiment, since the reproduction track number and tracking error (TRE2) are used together, the stopping position detection precision is enhanced. As a result, an optimum start timing can be set.

(Step 3): If the tape driver 2 could start up the tape to the stationary speed instantly, it could be put on track directly by starting at the timing determined in (Step 2). Actually, however, owing to the inertia of the tape driver 2, it takes a certain time until the tape reaches the stationary speed. Therefore, considering its allowance Δt timing t11 is the final start timing.

(Step 4): Waiting for the externally supplied start command, the drive start command is issued at the timing of (Step 3).

As a result, the head tracing after start is as indicated by broken line b, and the center of the target track can be scanned immediately after startup.

FIG. 13 shows the operation of timing controller 6 at other stopping position. In this case, since the stopping position crosses over two tracks, different values, (n+2) and (n), are obtained in the first half and second half of the scanning period as the reproduction track number. Supposing the last detected track number to be the track to be set on track, track (n) is the one to be set on track. Therefore, the scanning period when the reference track number is (n) is the approximate start timing. Also, if the recording pattern of the pilot signal is same as in FIG. 12, the polarity of TRE2 is negative, and it is known to be stopped at a position closer to the track (n+1) of the stopping range in which the track number is judged to be (n). At point p12 (t12 on time axis) remote from the starting end of scanning period than the above point p10, the head is nearly on track (n), and it is regarded as an ideal start position, and the timing t13 back by the starting time allowance is the actual start timing.

As explained herein, if the same track number (n), is detected, by checking the polarity of the tracking error signal TRE2 sampled at a specific timing, the detecting position of stopping position may be further enhanced. If the start timing is varied depending on the detected position (in this embodiment t11 or t13), it may be brought closer to the ideal start timing, so that the time until completion of tracking may be shortened.

That is, according to the embodiment, on the tape of multi-segment recording, frame synchronization and tracking lead-in may be achieved at high speed.

Herein, the position detecting accuracy is improved by detecting the polarity of the TRE2, and an example of varying the starting timing depending on the detected stopping position is shown. Instead, by employing the method as shown in FIG. 6, it is also possible to raise the stopping position detecting precision, and vary the start timing depending on that stopping position. In this case, needless to say, the time until completion of tracking may be further shortened.

This embodiment is an example of realizing the invention, and various applications are possible. In the embodiment, the explanation about the tracks differing in azimuth is omitted, but including them, modifications of the head composition on the drum, tape winding angle and others are included in the scope of the invention. For example, in the case of two-channel reproduction shown in the embodiment, the position information is sufficient with the track number information from the head of one channel, and actually the least significant bit (LSB) of the track number recorded on the tape may be regarded to be erased.

Similarly, the steps for determining the start timing in the timing controller are also an example, and it is sufficient as long as the start timing is determined depending on the tape position detected from the reproduction track number and tracking error signal, and the process itself is not particularly limited. As for the track to be set on track, if reproduction is desired using the same head as used for recording, it may be possible to wait for the timing when the head returns to the scanning point.

Figure 14:
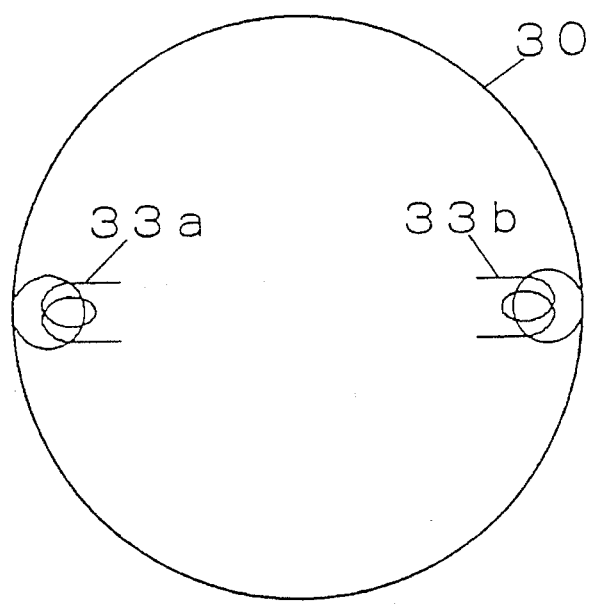
FIG. 14 is a diagram showing an example of a configuration of heads mounted on a drum main body.

The case of one-channel reproduction is explained below. The head configuration on the drum main body 30 is shown in FIG. 14. In FIG. 14, 33a, 33b are heads, which possess different azimuth angles. The heads 33a, 33b are mounted on the same height across 180 degrees. In one-channel reproduction, the head tracing when stopping differs from the two-channel reproduction.

Figure 15A:
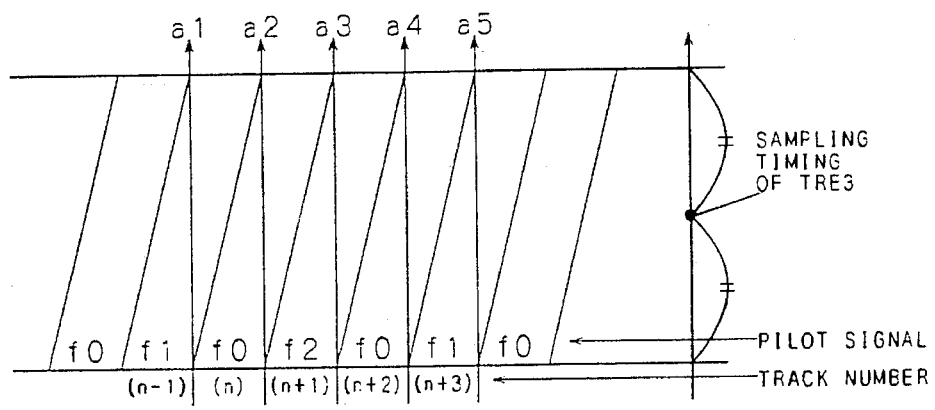
FIGS. 15(a) and 15(b) are explanatory diagrams of a stopping position detecting method in the case of a head configuration shown in FIG. 14.

FIG. 15 shows the head tracing when stopping in the same schematic diagram as in the preceding embodiments. In FIG. 15(a), a1 to a5 show the head tracing on the tape 1. The diagram is deformed so that the head tracing may be vertical. In this case, it is controlled so that the head 33a tracks the f0 track. Different from the previous case of two-channel recording, the head tracing crosses only one track of the same azimuth when stopping. If the stopping position is a1 to a3, (n) is detected as the reproduction track number. If the stopping position is a3 to a5, (n+2) is detected as the reproduction track number.

Figure 15B:
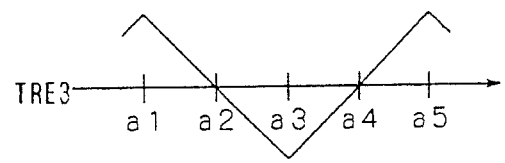

Suppose (n) is detected as the reproduction track number. The correspondence of the track number and recorded pilot number is known. In this case, too, the stopping position detecting precision may be enhanced by using the tracking error signal. Herein, the tracking error signal sampled at the intermediate timing of one scanning period Is supposed to be TRE3. At this time, TRE3 obtained by varying the stopping position from a1 to a5 is shown in FIG. 15(b). If (n) is detected as reproduction track number, the stopping position is in a range of a1 to a3. As understood from FIG. 15(b), if stopped at a1 to a2, the polarity of the TRE3 to be detected is positive (+), and if stopped at a2 to a3, the polarity of TRE3 is negative (−). That is, if (n) is detected as the reproduction track number, it is known that the stopping position is in a range of a1 to a3, and by detecting the polarity of TRE3, it is distinguished that the stopping position is in a range of a1 to a2 or a2 to a3. Therefore, also in the case of one-channel reproduction, by using the tracking error signal, the stopping position maybe detected at high precision. If the stopping position can be detected, by starting up at the optimum timing depending on the position, the head can be placed on the desired track right after starting, which is the same as in the preceding embodiment, and a detailed description is omitted herein.

Incidentally, the track number is generally the address information for distinguishing the data block units divided from a frame, and the frame number and block number are often included aside from the track number in the frame shown in the embodiments. In the reproduction track number detector, such information may be utilized as required. The information necessary for tracking mentioned in the embodiments may require not only the track number in the frame but also the frame number, if the frame period is not an integer multiple of the tracking error signal period.

The practical mode of transmission of the output of the reproduction track number detector is not particularly defined. The signal may be serial, parallel or multiplex.

The frame of the data to be recorded may be a frame corresponding to one frame when recording video signals, for example, or by using a color frame, color framing may be also possible.

What is claimed is:

1. A signal reproducing apparatus for reproducing data from a recording tape in which data and pilot signals for tracking have been recorded in oblique tracks, comprising:

tape driving means for running the recording tape in a longitudinal direction thereof;

a rotary head for rotating and scanning the recording tape and reproducing the data recorded therein to obtain a reproduced signal which contains reproduced data and reproduced pilot signals;

reference generating means for generating a reference signal which is a rotation reference of the rotary head;

tracking error detecting means for detecting a tracking error signal from the reproduced pilot signals contained in the reproduced signal;

timing control means for controlling a tape running start timing at which the tape driving means starts running the recording tape from a tape stopped state in which the recording tape is not running, said timing control means controlling the tape running start timing with respect to the reference signal based on a value of the tracking error signal detected by the tracking error detecting means at a specific timing which is predetermined in each rotation scanning period of the rotary head and the reference signal in the tape stopped state.

2. An apparatus according to claim 1, wherein said timing control means controls the tape running start timing depending on whether the value of the tracking error signal at said specific timing is above a predetermined value.

3. An apparatus according to claim 1, wherein said timing control means controls the tape running start timing based on a mean value of the tracking error signal detected by the tracking error detecting means within a specific period of time which is predetermined in each rotation scanning period of the rotary head and the reference signal in the tape stopped state.

4. A signal reproducing apparatus for reproducing data from a recording tape in which data and pilot signals for tracking have been recorded in oblique tracks, comprising:

tape driving means for running the recording tape in a longitudinal direction thereof;

a rotary head for rotating and scanning the recording tape and reproducing the data recorded therein to obtain a reproduced signal which contains reproduced data and reproduced pilot signals;

reference generating means for generating a reference signal which is a rotation reference of the rotary head;

tracking error detecting means for detecting a tracking error signal from the reproduced pilot signals contained in the reproduced signal;

timing control means for controlling a tape running start timing at which the tape driving means starts running the recording tape from a tape stopped state in which the recording tape is not running, said timing control means controlling the tape running start timing with respect to the reference signal based first and second values of the tracking error signals which are respectively detected by the tracking error detecting means at mutually different first and second specific timings which are predetermined in each rotation scanning period of the rotary head and the reference signal in the tape stopped state.

5. An apparatus according to claim 4, wherein said timing control means controls the tape running start timing depending on a relationship between a polarity of said first value of the tracking error signal and a polarity of said second value of the tracking error signal.

6. An apparatus according to claim 4, wherein said timing control means controls the tape running start timing depending on a result of comparison of at least one of said first value of the tracking error signal and said second value of the tracking error signal with a predetermined value.

7. An apparatus according to claim 4, wherein said timing control means controls the tape running start timing based on a first mean value of the tracking error signal detected by the tracking error detecting means within a first specific period of time which is predetermined in each rotation scanning period of the rotary head, a second mean value of the tracking error signal detected by the tracking error detecting means within a second specific period of time which is predetermined in each rotation scanning period of the rotary head, and the reference signal in the tape stopped state, the first and second specific periods of time being different from each other.

8. A signal reproducing apparatus for reproducing data from a recording tape in which data of a plurality of frames and pilot signals for tracking have been recorded in oblique tracks, data of each frame being divided and recorded in a predetermined number of plural oblique tracks, each track having further recorded therein a track number for distinguishing a track position in one frame, said apparatus comprising:

tape driving means for running the recording tape in a longitudinal direction thereof;

a rotary head for rotating and scanning the recording tape and reproducing the data recorded therein to obtain a reproduced signal which contains reproduced data, reproduced pilot signals and a reproduced track number;

reference generating means for generating a reference signal which is a rotation reference of the rotary head;

track number detecting means for detecting the reproduced track number contained in the reproduced signal;

tracking error detecting means for detecting a tracking error signal from the reproduced pilot signals contained in the reproduced signal;

timing control means for controlling a tape running start timing at which the tape driving means starts running the recording tape from a tape stopped state in which the recording tape is not running, said timing control means controlling the tape running start timing with respect to the reference signal based on a value of the tracking error signal detected by the tracking error detecting means at a specific time which is predetermined in each rotation scanning period of the rotary head, the reproduced track number detected by the track number detecting means and the reference signal in the tape stopped state.

9. An apparatus according to claim 8, wherein said timing control means controls the tape running start timing depending on whether the value of the tracking error signal at said specific timing is above a predetermined value.

10. An apparatus according to claim 8, wherein said timing control means controls the tape running start timing based on a mean value of the tracking error signal detected by the tracking error detecting means within a specific period of time which is predetermined in each rotation scanning period of the rotary head and the reference signal in the tape stopped state.

11. A signal reproducing apparatus for reproducing data from a recording tape in which data of a plurality of frames and pilot signals for tracking have been recorded in oblique tracks, data of each frame being divided and recorded in a predetermined number of plural oblique tracks, each track having further recorded therein a track number for distinguishing a track position in one frame, said apparatus comprising:

tape driving means for running the recording tape in a longitudinal direction thereof;

a rotary head for rotating and scanning the recording tape and reproducing the data recorded therein to obtain a reproduced signal which contains reproduced data, reproduced pilot signals and a reproduced track number;

reference generating means for generating a reference signal which is a rotation reference of the rotary head;

track number detecting means for detecting the reproduced track number contained in the reproduced signal;

tracking error detecting means for detecting a tracking error signal from the reproduced pilot signals contained in the reproduced signal;

timing control means for controlling a tape running start timing at which the tape driving means starts running the recording tape from a tape stopped state in which the recording tape is not running, said timing control means controlling the tape running start timing with respect to the reference signal based on first and second values of the tracking error signal which are respectively detected by the tracking error detecting means at mutually different first and second specific timings which are predetermined in each rotation scanning period of the rotary head, the reproduced track number detected by the track number detecting means and the reference signal in the tape stopped state.

12. An apparatus according to claim 11, wherein said timing control means controls the tape running start timing depending on a relationship between a polarity of said first value of the tracking error signal and a polarity of said second value of the tracking error signal.

13. An apparatus according to claim 11, wherein said timing control means controls the tape running start timing depending on a result of comparison of at least one of said first value of the tracking error signal and said second value of the tracking error signal with a predetermined value.

14. An apparatus according to claim 11, wherein said timing control means controls the tape running start timing based on a first mean value of the tracking error signal detected by the tracking error detecting means within a first specific period of time which is predetermined in each rotation scanning period of the rotary head, a second mean value of the tracking error signal detected by the tracking error detecting means within a second specific period of time which is predetermined in each rotation scanning period of the rotary head, and the reference signal in the tape stopped state, the first and second specific periods of time being different from each other.

* * * * *